Feb. 24, 1959     E. J. MASTAK     2,874,566
APPARATUS FOR TESTING WALL STRUCTURE OF HOLLOW ARTICLES
Filed July 6, 1956     3 Sheets-Sheet 1

*INVENTOR.*
EDMOND J. MASTAK
BY
*M. A. Hobbs*
ATTORNEY

INVENTOR.
EDMOND J. MASTAK
BY
M. A. Hobbs
ATTORNEY

United States Patent Office 2,874,566
Patented Feb. 24, 1959

2,874,566

APPARATUS FOR TESTING WALL STRUCTURE OF HOLLOW ARTICLES

Edmond J. Mastak, South Bend, Ind., assignor to Summit Manufacturing Company, a Division of Ace Tool Engineering Co., Inc., South Bend, Ind., a corporation of Indiana Application July 6, 1956, Serial No. 596,319

15 Claims. (Cl. 73—40)

The present invention relates to a testing apparatus and more particularly to an apparatus for testing with predetermined pressures the soundness of wall structures of hollow articles or devices.

One of the principal objects of the present invention is to provide an apparatus for testing hollow articles and devices with a minimum amount of time and effort being required for loading, testing and unloading the articles or devices tested.

Another object of the invention is to provide a relatively simple, easily operated apparatus for pressure testing the wall structures of hollow articles having a plurality of unconnected cavities for cracks, porosity and the like.

Another object of the invention is to provide an apparatus for testing at accurately controlled predetermined pressures and time the wall structures of hollow articles having one or more independent cavities.

Still another object of the invention is to provide an apparatus for testing the wall structures defining a plurality of cavities in hollow articles, in which said cavities are tested independently in sequence or simultaneously without moving or adjusting either the apparatus or article from one testing step to another.

A further object of the invention is to provide an easily serviced and maintained apparatus for testing hollow articles at relatively high predetermined hydraulic pressures, which can readily be installed as a unit and which requires only the normally available utilities for operation.

Additional objects and advantages will become apparent from the following description and accompanying drawings, wherein.

Figure 1:
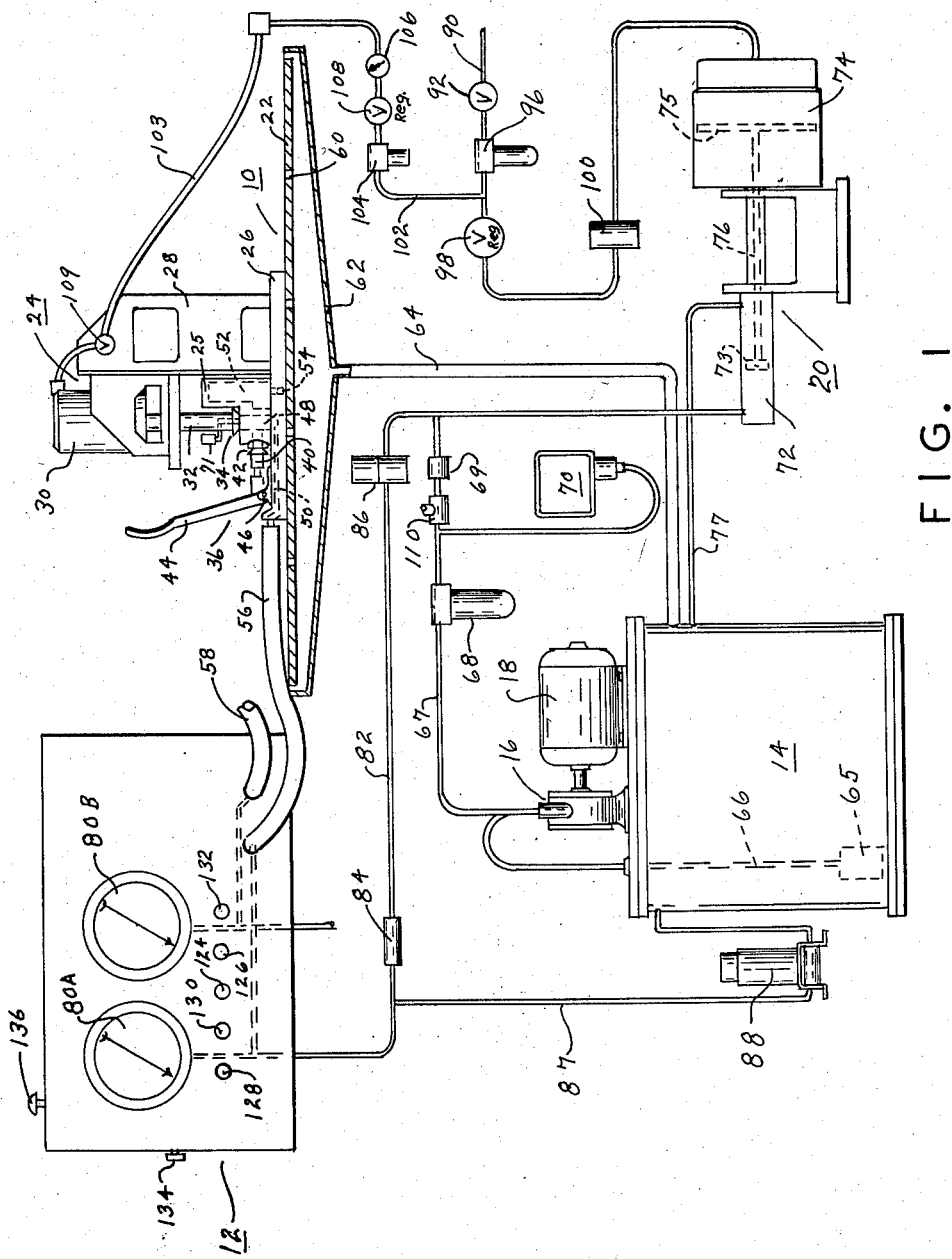
Figure 1 is an elevational view of my testing apparatus in which a number of the parts thereof have been rearranged to more effectively show the operative relationship of said parts.

Referring more specifically to the drawings and to Figure 1 in particular, numeral 10 designates the work table, 12 an instrument panel, 14 a hydraulic fluid reservoir, 16 a positive displacement pump for filling the testing system and cavities of the article being tested with the hydraulic fluid, 18 an electrical motor for driving the pump, and 20 a pneumatic booster for increasing the hydraulic fluid pressure in the lines to the article being tested and to the respective gauge on the instrument panel. The present apparatus is designed to test in sequence or simultaneously a plurality of cavities in an article after it has been placed in testing position on the work table without moving or adjusting the article during the testing operation. In making the sequential or simultaneous test two identical hydraulic subsystems are employed. The schematic diagrams of the hydraulic and electrical systems show the two complete subsystems whereas the elevational view in Figure 1 shows only one complete subsystem and parts of the second subsystem. Since the two subsystems are similar in construction and operation only one will be discussed in detail herein.

The work table 10 consists of a perforated base panel 22 having mounted thereon a fixture 24 for holding articles 25 to be tested, said articles normally being steel, aluminum or magnesium casting or forgings containing one or more cavities with openings therefrom through the walls of the articles. While a single fixture may sometimes be used in testing a variety of different types of hollow articles and may operate satisfactorily on various size articles, it is usually necessary to provide specially designed fixtures for each type of article tested. The fixture shown in the drawing has a flat base 26 on which is mounted a support 28 for an air cylinder 30 and plunger 32 operated by the air cylinder. The plunger with a sealing member 34 on the lower end thereof seats into or around an opening in the article to close the opening and simultaneously applies pressure to the article to seat said article firmly on the top surface of base 26. A sealing ring or gasket may be provided on the top surface of the base to form a fluid tight seal between the bottom of the article and said surface. All of the openings through the article walls must be sealed or plugged with some suitable device such as plunger 32; however other types of sealing means can be used if desired. For example, a mechanical sealing mechanism is shown at numeral 36 consisting of a plunger 40 having a sealing member 42 for seating over an opening on the side of the article and a manually operated lever 44 pivoted on pin 46 for moving plunger 40 to and from the opening. The hydraulic fluid is transmitted to cavity 48 in the article from the hydraulic system through passage 50 and to cavity 52 through passage 54, passages 50 and 54 being connected to their respective hydraulic systems through flexible tubes 56 and 58. Fixture 24 may be bolted or otherwise clamped to panel 22 although this is usually unnecessary.

When the article is removed from fixture 24 the hydraulic fluid drains from the cavities and flows through holes 60 in panel 22 into a trough 62 under said panel and is returned to reservoir 14 through a drain tube 64.

In the hydraulic system, the fluid is pumped from reservoir 14 through a strainer 65 and line 66 and is pressurized by a positive displacement pump 16 which in combination with a return by-pass (not shown) delivers the fluid at a predetermined constant pressure to line 67 and thence to pneumatic booster 20. Line 67 contains a filter 68 of any suitable construction and a check valve 69 to prevent back flow of the fluid to the pump and to a pressure actuated control switch 70 when booster 20 is in operation. As the hydraulic fluid fills the lines of the systems and the cavities of the article, the air therein must be bled from those lines. A passage 71 controlled by a bleed valve in plunger 32 is one satisfactory means for removing the air. A suitable air bleed valve is shown in application Serial No. 598,301, filed July 17, 1956, common ownership. The pressure actuated switch 70 is connected to line 67 between the filter and check valve and is adapted to become operable when the pressure in the line indicates that the system and the article being tested have been completely filled with hydraulic fluid.

A number of well known types of pneumatic and vacuum boosters can be used, all of which consist of a small cylinder 72 having a piston 73 therein actuated by a substantially larger pneumatic or vacuum cylinder 74 having a piston or diaphragm 75 connected to the small piston by rod 76. The construction and operation of these boosters are well known and need not be described in detail herein. The space in cylinder 72 on the back side of piston 73 is connected by a line 77 to the reservoir for the purpose of draining from said cylinder any fluid accidentally leaking around said piston. Line 67 between check valve 69 and the booster is connected to a gauge 80A on the instrument panel and to flexible tube 56 by a line 82 having therein a check valve 84 to maintain the test pressure in the line between the gauge and the article and to prevent back flow in the line when the pressure is released by the booster, and a solenoid actuated drain valve 86 for permitting the fluid in line 82 between said check valve and booster to return to the reservoir when the test has been completed. The fluid is drained from the system posterior to check valve 84 to reservoir 14 by a line 87 controlled by a solenoid actuated valve 88.

In the apparatus shown in the drawings the booster is operated by a pneumatic system consisting of a line 90 adapted to be connected to the standard air line of a plant and having therein a manually operated cut-off valve 92, a conventional air filter 96, an air regulator 98 and an electrically operated control valve 100. The regulator is set by the operator to supply a preselected pressure to cylinder 74 of the booster which in turn creates a predetermined pressure in the respective hydraulic system for testing the article mounted in fixture 24. Control valve 100 is either fully opened or completely closed and becomes operable only after the hydraulic system has been filled and is ready for testing the article. A branch air line 102 together with a flexible tube 103 connects line 90 between filter 96 and air regulator 98 with fixture 24 and contains therein an air lubricator 104, a pressure gauge 106 and a pressure regulator control valve 108 which is employed to regulate the supply of air to said fixture. A manually operated valve 109 mounted on the fixture controls the operation of air cylinder 30 and any other similar cylinders which may be used to plug openings in article 25. When valve 109 is in one position air from line 90 is admitted into cylinder 30 and when in another position the air from said line is cut off and the line between valve 109 and the cylinder is opened to atmospheric pressure to permit a spring (not shown) in cylinder 30 to retract plunger 32 from the article.

Figure 2:
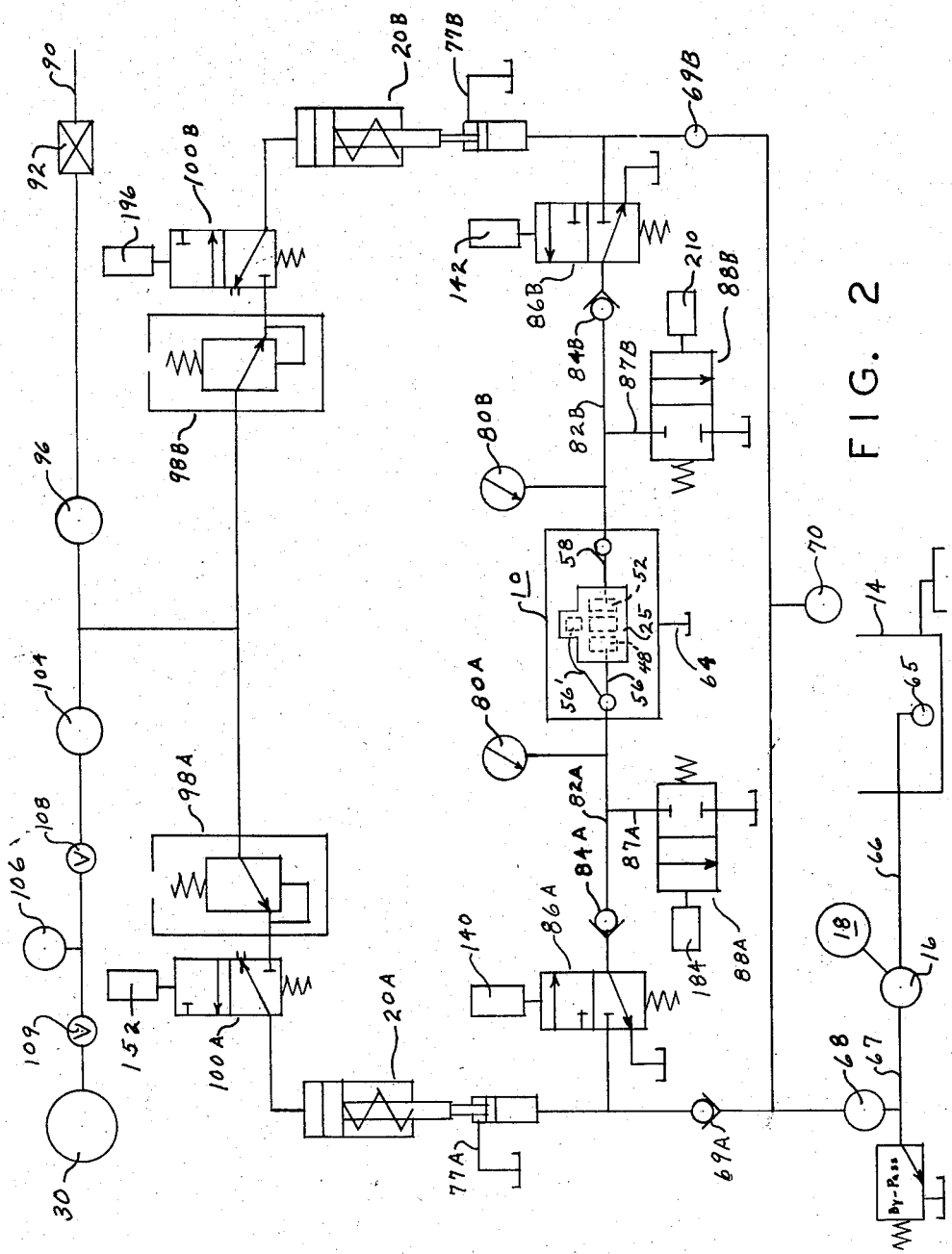
Figure 2 is a schematic diagram of the hydraulic system of my testing apparatus.

The foregoing description covers one complete subsystem. The second subsystem branches off the main line 67 at joint 110 and the two subsystems posterior to said joint are substantially the same in construction components and operation. Pump 16 and main line 67 supply hydraulic fluid to both branch lines simultaneously. The operation of the hydraulic subsystems in the complete system can be readily understood by reference to the schematic diagram (in J. I. C. Standard Symbols) of the system shown in Figure 2, wherein one subsystem is designated by the numeral plus the suffix A and the other subsystem with the numeral plus the suffix B. The schematically shown valves, for example 86A, 86B, 88A and 88B, are moved in one direction by a solenoid and the opposite direction by a spring (indicated by a zig-zag line) and arrows therein indicate the direction of fluid flow through the valve when the valve body is moved to the position to connect the two lines entering and leaving the valve. Symbols 77A and 77B and all like symbols used in Figure 2 indicate a drain connection to reservoir 14. After an article has been placed in fixture 24 on work table 10, air is admitted through valve 109 to cylinder 30 to lower plunger 32 and clamp said article in the fixture. Pump 16 then supplies hydraulic fluid through line 67, filter 68 and check valves 69A and 69B to cylinder 72 and through valves 86A and 86B, lines 82A and 82B and check valves 84A and 84B to gauges 80A and 80B and through tubes 56 and 58 and passages 50 and 54 to cavities 48 and 52, respectively, in article 25. As the fluid is being delivered to the cavity the air is permitted to escape through one of the openings in the article and/or through the valve controlled air vent 71 in plunger 32. After the cavity and all of the lines of the subsystem leading to the cavity have been filled with hydraulic fluid, the air vents for the cavity automatically close and the pressure commences to rise in the hydraulic line.

When this pressure reaches a predetermined amount, pressure switch 70 closes and energizes booster 20A which thereafter increases the pressure in line 82A, tube 56 and in the cavity to the test pressure. The operation of the booster is discontinued and the test pressure in line 82A posterior to check valve 84A and in cavity 48 is read on gauge 80A after a predetermined period of time, for example ten seconds. If the walls of the cavity are sound, the pressure of the fluid entrapped in the cavity, tube 56 and line 82A posterior to check valve 84A will remain at the preselected test pressure as indicated on gauge 80A. If however the walls of the article defining the cavity contain cracks or are porous, leakage of the fluid in the cavity occurs and hence a drop in the pressure of the entrapped fluid results. The operator by observing the pressure drop on the gauge knows that the walls of the article are defective. After the test has been completed, valve 88A is opened to permit the fluid entrapped in line 82A posterior to check valve 84A to return to the reservoir, thus relieving the test pressure in cavity 48. The subsystem connected to cavity 52 then becomes operative and applies pressure to the side walls of said cavity in the same manner as that described in connection with cavity 48. By this dual procedure the side walls of the article defining the two cavities not only are thoroughly tested but the walls of the article separating the two cavities are likewise tested and the two tests are completed without removing or readjusting the article in fixture 24. All independent cavities which are to be tested at a particular pressure, such as 600 p. s. i., may be connected into one subsystem by additional tubes (56′) communicating with line 82 posterior to check valve 84 or directly with tube 56 and all of the cavities which are to be tested at another particular pressure, such as 300 p. s. i., may be connected in a like manner into the other subsystem. Where cavities separated by a single wall structure are to be tested, the better practice is usually to test those cavities in sequence. For the purpose of illustration casting 25 is shown with two independent cavities tested at different pressures. When all of the cavities have been tested valve 109 is moved to the position to relieve the air pressure in cylinder 30 and permit plunger 32 to retract. The fluid then flows from the cavity through holes 60 in panel 22 and is returned to the reservoir through trough 62 and drain tube 64.

Figure 3:
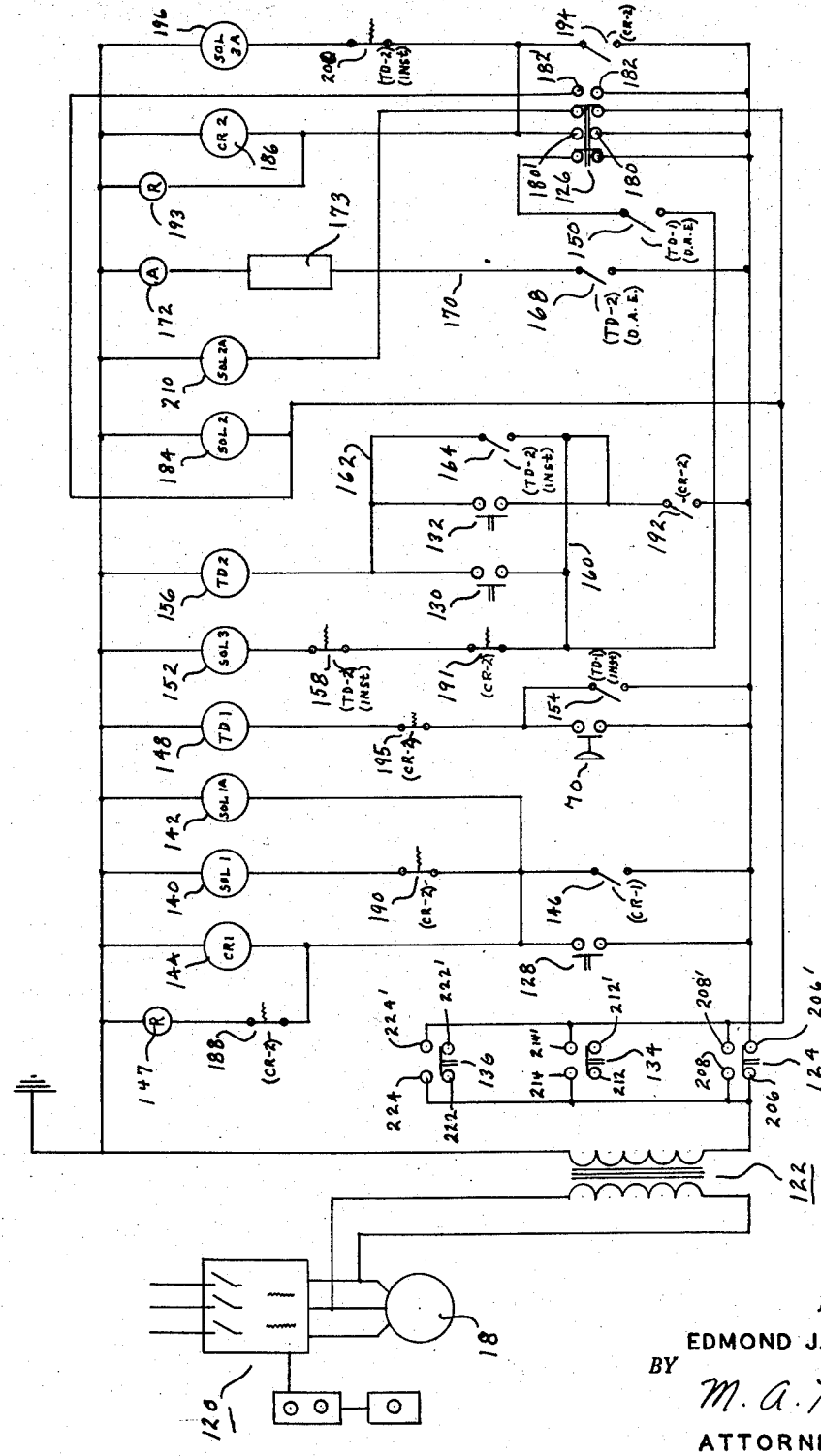
Figure 3 is a schematic diagram of the electrical system of my testing apparatus.

The sequence of operation of my apparatus can be more fully understood by reference to the electrical diagram of the control circuit shown in Figure 3. In this diagram the switches are in positions shown unless actuated either by the operator or their respective solenoids. Motor 18, motor control 120, transformer 122 and the component parts of the circuitry are conventional equipment and need not be described in detail herein. The manually controlled electrical switches or buttons are located on control panel 12 and are designated by numerals 124, 126, 128, 130, 132, 134 and 136. After an article has been mounted and clamped in fixture 24, switch 128 is closed, thus energizing solenoids 140 and 142 which respectively move valves 86A and 86B to their open positions permitting the fluid to flow through lines 82A and 82B leading independently to separate cavities in the article being tested. Since switch 128 is a momentary contact switch the circuit to solenoids 140 and 142 is held closed by a solenoid 144 energized when switch 128 is closed to hold closed switch 146 of a circuit by-passing switch 128. Closing the circuits to solenoids 140 and 142 also closes the circuit to a red signal light 147 for indicating to the operator that the first subsystem is in operation. The switches in the diagram which are moved to open position by a solenoid are indicated as such by a spring (a zig-zag line) attached thereto. The switches with stems, such as 124 and 128, are manually operated switches and switches such as 146 are moved to closed position by a solenoid.

With the foregoing circuits closed and the pump operating, hydraulic lines 67 and 82A and 82B, cylinder 72 of the boosters, tubes 56 and 58 and the cavities of the article to be tested are filled with fluid at a relatively low pressure. As soon as these lines and cavities are full, the pressure therein rises sufficiently to actuate pressure switch 70 automatically energizing solenoid 148 which closes switch 150 completing the circuit for energizing solenoid 152. This solenoid opens valve 100A and admits air to cylinder 74 of booster 20A which boosts the pressure in the respective subsystem and cavity being tested to the desired predetermined test pressure. Solenoid 148 also closes and holds closed switch 154 so that the circuit to said solenoid will remain closed independently of the pressure transmitted to pressure switch 70. When booster 20A has increased the pressure in line 82A, tube 56, and the cavity being tested to the preselected figure, the operator closes momentary contact switch 130 energizing sclenoid 156 which opens switch 158 thus deenergizing solenoid 152 and permitting valve 100A to close and vent cylinder 74 to the atmosphere, thus deactuating booster 20A. Solenoid 156 which continues to be energized through leads 160 and 162 and switch 164 closed by said solenoid, also closes switch 168 of a flasher light circuit 170 having an amber light 172 and flasher control 173 therein for indicating to the operator when the test period has been completed, said switch 168 as operated by solenoid 156 being provided with a predetermined time delay to provide the desired timing for the test. The operator then checks gauge 80A to determine whether the article being tested is defective, as previously described herein.

When the test of the first cavity has been completed as described, the operator moves switch 126 to the right as seen in Figure 3 closing contacts 180 and 180' and 182 and 182', energizing solenoid 184 for opening valve 88A to drain the subsystem of the cavity just tested and energizing solenoid 186 which opens switch 188, to turn off signal light 147, opens switch 190 to close valve 86A and drain line 82A anterior to check valve 84A, opens switch 191 to prevent further energizing of solenoid 152, and closes switch 192. Contacts 180 and 180' turn on signal light 193, indicating to the operator that the second subsystem is in operation, and energize solenoid 196 which closes air control valve 100B. Solenoid 186 also closes switch 194 completing the circuit by-passing switch 126, and switch 195 preventing operation of valve 100A and hence the operation of booster 20A. When this sequence has been completed booster 20B becomes operable to increase the pressure in the respective subsystem to the desired testing pressure as determined by air regulator 98B.

The operator now closes momentary contact switch 132 which completes the circuit from previously closed switch 192 and again brings into operation solenoid 156 which opens switch 200 deenergizing solenoid 196 thereby rendering booster 20B inoperative, closes switch 168 of the flasher circuit 170 after a predetermined time delay and closes holding switch 164. The operator then checks gauge 80B to determine whether the walls of the second cavity tested are defective. The test having been completed, the operator throws switch 124, opening contacts 206 and 206' thereby interrupting the circuit to both subsystems of the apparatus rendering them inoperable and simultaneously closing contacts 208 and 208' energizing solenoids 184 and 210 to open valves 88A and 88B respectively to drain the fluid from the systems to reservoir 14.

When the apparatus is to be shut down, switch 134 is operated, opening contacts 212 and 212' thereby breaking the circuit to motor 18 and closing contacts 214 and 214' closing the circuit to solenoids 184 and 210 to open valves 88A and 88B respectively to drain the fluid from the systems to the reservoir. Switch 136 located in a place easy to reach by the operator is provided to interrupt the operation completely in the event of an emergency. When this switch is operated contacts 222 and 222' are broken, stopping motor 18 and contacts 224 and 224' are connected closing the circuit to solenoids 184 and 210 to open valves 88A and 88B to drain the fluid from the system to the reservoir, thus promptly relieving all elevated pressures in the two hydraulic subsystems. In order to start the apparatus again commencing with the first test cycle, the starting button on the motor control is first actuated and then switches 124, 126 and 128 are closed as previously explained herein. During normal operation of the apparatus the motor runs continuously from one test to another and is only turned off in case of an emergency or at the end of the operation.

Various changes can be made in the construction and operation of the present apparatus. For example, one complete subsystem can be used or a greater number of subsystems can be employed in a single test sequence. Further, if desired, my apparatus can be modified so that the two subsystems described herein can be operated simultaneously, for use in testing at different pressures articles having a plurality of independent cavities not separated by a single common wall.

I claim:

1. An apparatus for testing articles having a plurality of independent cavities and a port therefrom, comprising a reservoir for hydraulic fluid, a conduit system having a main line and separate branch lines for supplying fluid for the cavities, a pump in said main line for delivering fluid from said reservoir to each of said branch lines, a motor for driving said pump, a means for filtering said fluid before entering said branches, a mechanism in each branch line for increasing the fluid pressure in its respective branch lines, a check valve in each branch line to prevent back flow therein from said mechanism to the main line, a check valve in each branch line posterior to said mechanism to prevent back flow therein, a drain valve in each branch line between said mechanism and said last mentioned check valve, an electrical means for operating said drain valve, a drain valve in each branch line posterior to said last mentioned check valve, an electrical means for operating said last mentioned drain valve, a fluid pressure gauge for each branch line communicating therewith between said last mentioned check valve and the article being tested, a source of air for operating said mechanisms, a means for selecting a predetermined air pressure, electrically operated valves for controlling the air supply to said mechanisms, a switch responsive to the pressure in said main line for opening one of said last mentioned valves, a work table, a fixture on said table having a pneumatic means for closing said port and connecting the cavities of said article to said branch lines, and a drain means for returning the fluid in said cavities to the reservoir after the article has been tested.

2. An apparatus for testing articles having a plurality of independent cavities and a port therefrom, comprising a conduit system having a main line and separate branch lines for supplying fluid for the cavities, a pump in said main line for delivering fluid to each of said branch lines, a means for filtering said fluid before entering said branches, a mechanism in each branch line for increasing the fluid pressure in its respective branch lines, a check valve in each branch line to prevent back flow therein from said mechanism to the main line, a check valve in each branch line posterior to said mechanism to prevent back flow therein, a drain valve in each branch line between said mechanism and said last mentioned check valve, a drain valve in each branch line posterior to said last mentioned check valve, a fluid presssure gauge for each branch line communicating therewith between said last mentioned check valve and the article being tested, a source of air for operating said mechanisms, a means for selecting a predetermined air pressure for each of said mechanisms, electrically operated valves for controlling the air supply to said mechanisms, a switch responsive to the pressure in said main line for opening one of said last mentioned valves, a fixture having a pneumatic means for closing said port and connecting the cavities of said article to said branch lines, and a drain means for returning the fluid in said cavities to the reservoir after the article has been tested.

3. An apparatus for testing articles having a plurality of independent cavities and a port therefrom, comprising a conduit system having a main line and separate branch lines for supplying fluid to said cavities, a pump in said main line for delivering fluid to each of said branch lines, a mechanism in each branch line operated by a controlled supply of air for increasing the fluid pressure in its respective branch lines, a check valve in each branch line to prevent back flow therein from said mechanism to the main line, a check valve in each branch line posterior to said mechanism to prevent back flow therein, a drain valve in each branch line between said mechanism and said last mentioned check valve, a drain valve in each branch line posterior to said last mentioned check valve, a fluid pressure gauge for each branch line communicating therewith between said last mentioned check valve and the article being tested, a means for selecting a predetermined air pressure for operating each of said mechanisms, valves for controlling the air supply to said mechanisms, a means responsive to the pressure in said main line for opening one of said last mentioned valves, a fixture having a pneumatic means for closing said port and connecting the cavities of said article to said branch line.

4. An apparatus for testing articles having a plurality of independent cavities, comprising a reservoir for hydraulic fluid, a conduit system having a main line and separate branch lines for supplying fluid for the cavities, a pump in said main line for delivering fluid from said reservoir to each of said branch lines, a mechanism in each branch line for increasing the fluid pressure in its respective branch lines, a check valve in each branch line to prevent back flow therein from said mechanism to the main line, a check valve in each branch line posterior to said mechanism to prevent back flow therein, a drain valve in each branch line between said mechanism and said last mentioned check valve, a drain valve in each branch line posterior to said last mentioned check valve, a fluid pressure gauge for each branch line communicating therewith between said last mentioned check valve and the article being tested, a source of air for operating said mechanisms, a means for selecting a predetermined air pressure for each of said mechanisms, electrically operated valves for controlling the air supply to said mechanisms, and a switch responsive to the pressure in said main line for opening one of said last mentioned valves.

5. An apparatus for testing articles having a plurality of independent cavities, comprising a conduit system having a main line and separate branch lines for supplying fluid for the cavities, a pump in said main line for delivering fluid to each of said branch lines, a mechanism in each branch line for increasing the fluid pressure in its respective branch lines, a check valve in each branch line to prevent back flow therein from said mechanism to the main line, a check valve in each branch line posterior to said mechanism to prevent back flow therein, a drain valve in each branch line between said mechanism and said last mentioned check valve, a drain valve in each branch line posterior to said last mentioned check valve, a fluid pressure gauge for each branch line communicating therewith between said last mentioned check valve and the article being tested, a source of fluid under pressure for operating said mechanisms, a means for selecting a predetermined pressure for each of said mechanisms, electrically operated valves for controlling the fluid supply to said mechanisms, and a switch responsive to the pressure in said main line for opening one of said last mentioned valves.

6. An apparatus for testing articles having a plurality of independent cavities, comprising a reservoir for hydraulic fluid, a conduit system having a main line and separate branch lines for supplying fluid for each cavity, a pump in said main line for delivering fluid from said reservoir to each of said branch lines, a mechanism in each branch line for increasing the fluid pressure in its respective branch lines, a check valve in each branch line to prevent back flow therein from said mechanism to the main line, a drain valve in each branch line posterior to said last mentioned check valve, a fluid pressure gauge for each branch line communicating therewith between said last mentioned check valve and the article being tested, a source of fluid under pressure for operating said mechanisms, a means for selecting a predetermined pressure for each of said mechanisms, valves for controlling the fluid supply to said mechanisms and a means responsive to the pressure in said main line for opening one of said last mentioned valves.

7. An apparatus comprising a hydraulic fluid conduit system for testing two independent cavities in an article, comprising a reservoir for hydraulic fluid, a conduit system having a main line and two separate branch lines for said independent cavities in the article, a pump in said main line for delivering fluid from said reservoir to each of said branch lines, a mechanism in each branch line for increasing the fluid pressure in its respective branch lines, a check valve in each branch line to prevent back flow therein from said mechanism to the main line, a check valve in each branch line posterior to said mechanism to prevent back flow therein, a drain valve in each branch line between said mechanism and said last mentioned check valve, a drain valve in each branch line posterior to said last mentioned check valve, a fluid pressure gauge for each branch line communicating therewith between said last mentioned check valve and the article being tested, a source of fluid under pressure for operating said mechanisms, a means for selecting a predetermined pressure for each of said mechanisms, valves for controlling the fluid supply to said mechanisms, a means responsive to the pressure in said main line for opening one of said last mentioned valves, and a fixture having a pneumatic means for connecting the cavities of said articles to said branch lines.

8. In an apparatus for testing two independent cavities in an article: a reservoir for hydraulic fluid, two separate lines for said independent cavities in the article, pump means for delivering fluid from said reservoir to each of said lines, a fluid pressure actuated mechanism in each line for increasing the fluid pressure in its respective lines, a check valve in each line to prevent back flow therein from said mechanism to the pump means, a check valve in each line posterior to said mechanism to prevent back flow therein, a drain valve in each line between said mechanism and said last mentioned check valve, a drain valve in each line posterior to said last mentioned check valve, and a fluid pressure gauge for each line communicating therewith between said last mentioned check valve and the article being tested.

9. In an apparatus for testing two independent cavities in an article: a reservoir for hydraulic fluid and two separate lines for said independent cavities in the article, a pump means for delivering fluid from said reservoir to each of said lines, a fluid pressure actuated mechanism in each line for increasing the fluid pressure in its respective lines, a check valve in each line to prevent back flow therein from said mechanism to the pump means, a drain valve in each line posterior to said last mentioned check valve, and a fluid pressure gauge for each line communicating therewith between said last mentioned check valve and the article being tested.

10. In an apparatus for testing a plurality of independent cavities in an article, a conduit system having a main line and a separate branch line for supplying fluid for each cavity, a pressure gauge operatively connected into each branch line, a pump in said main line for delivering fluid to each of said branch lines, a mechanism in each branch line for increasing the fluid pressure in its respective branch lines, a source of air for operating said mechanisms, a means for selecting a predetermined air pressure for each of said mechanisms, electrically operated valves for controlling the air supply to said mechanisms, and a switch responsive to the pressure in said main line for actuating one of said last mentioned valves.

11. In an apparatus for testing a plurality of independent cavities in an article, a conduit system having a main line and a separate branch line for supplying fluid for each cavity, a pressure gauge operatively connected into each branch line, a pump in said main line for delivering fluid to each of said branch lines, a pressure operated mechanism in each branch line for increasing the fluid pressure in its respective branch lines, a source of fluid under pressure for said mechanisms, a means for selecting a predetermined pressure for operating each of said mechanisms, valves for controlling the fluid supply to said mechanisms, and a means responsive to the pressure in said main line for opening one of said last mentioned valves.

12. In an apparatus for testing the wall structure of an article having a cavity therein: a conduit line, a pump in said line for delivering fluid to said cavity, a means in said line for filtering said fluid, a mechanism in said line for increasing the fluid pressure, a check valve in said line posterior to said mechanism to prevent back flow therein, a drain valve in said line between said mechanism and said check valve, a drain valve in the line posterior to said check valve a fluid pressure gauge for said line communicating therewith between said check valve and the article being tested, a means for selecting a predetermined air pressure for operating said mechanism, electrically operated valve for controlling the air supply to said mechanism, and a switch responsive to the pressure in said line for opening said last mentioned valve.

13. In an apparatus for testing the wall structure of hollow articles: a conduit line, a pressure gauge connected into said line, a pump in said line, a mechanism in said line for increasing the fluid pressure, a check valve in said line to prevent back flow therein from said mechanism to said pump, a drain valve in said line posterior to said last mentioned check valve, a source of air for operating said mechanism, a means for selecting a predetermined air pressure for said air, a valve for controlling the air supply to said mechanism, and a means responsive to the pressure in said line for opening said last mentioned valves.

14. An apparatus for testing articles having a plurality of independent cavities, comprising a conduit system having a main line and separate branch lines for supplying fluid for each cavity, a pressure creating means for supplying fluid through said main line to each of said branch lines, a mechanism in each branch line for increasing the fluid pressure in its respective branch lines, a check valve in each branch line to prevent back flow therein from said mechanism to the main line, a drain valve in each branch line posterior to said last mentioned check valve, a fluid pressure gauge for each branch line communicating therewith posterior to said last mentioned check valve, a source of fluid under pressure for operating said mechanisms, a means for selecting a predetermined pressure for each of said mechanisms, valves for controlling the fluid supply to said mechanisms, and a means responsive to the pressure in said main line for opening one of said last mentioned valves.

15. An apparatus for testing articles having a plurality of independent cavities, comprising a conduit system having a main line and separate branch lines for supplying fluid for each cavity, a pressure creating means for supplying fluid through said main line to each of said branch lines, a mechanism in each branch line for increasing the fluid pressure in its respective branch lines, a check valve in each branch line to prevent back flow therein from said mechanism to the main line, a drain valve in each branch line posterior to said last mentioned check valve, a fluid pressure gauge for each branch line communicating therewith posterior to said last mentioned check valve, a source of fluid under pressure for operating said mechanisms, a means for selecting a predetermined pressure for each of said mechanisms, and valves for controlling the fluid supply to said mechanisms.

References Cited in the file of this patent

UNITED STATES PATENTS

| | | |
|---|---|---|
| 1,429,949 | Jacobs | Sept. 26, 1922 |
| 1,554,637 | McKee | Sept. 22, 1925 |
| 1,811,138 | Lassman | June 23, 1931 |
| 2,459,535 | Kopischiansky | Jan. 18, 1949 |
| 2,497,193 | Webb | Feb. 14, 1950 |
| 2,633,739 | Potts et al. | Apr. 7, 1953 |